(12) United States Patent
Gibson et al.

(10) Patent No.: US 7,712,429 B1
(45) Date of Patent: May 11, 2010

(54) LAUNCH AND RECOVERY SYSTEM FOR UNMANNED UNDERSEA VEHICLES

(75) Inventors: Robert Gibson, Lynn Haven, FL (US); Robert Peebles, Lynn Haven, FL (US); Edward Hendrickson, Panama City Beach, FL (US); Danny Smith, Panama City Beach, FL (US); Sauer Brian, Brunswick, GA (US); William R. Walton, Lynn Haven, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 414 days.

(21) Appl. No.: 11/879,521

(22) Filed: Jun. 28, 2007

(51) Int. Cl.
*B63B 35/44* (2006.01)
(52) U.S. Cl. ................. 114/312; 114/259
(58) Field of Classification Search ............... 114/312, 114/313, 322, 337, 338, 258, 259; 298/12–14
See application file for complete search history.

(56) References Cited

U.S. PATENT DOCUMENTS

| | | | | | |
|---|---|---|---|---|---|
| 4,306,413 A | * | 12/1981 | Middleton | ................... | 60/478 |
| 5,253,605 A | * | 10/1993 | Collins | ........................ | 114/259 |
| 5,394,583 A | * | 3/1995 | Plate | ........................... | 14/69.5 |
| 5,454,684 A | * | 10/1995 | Berens | ....................... | 414/522 |
| 6,099,232 A | * | 8/2000 | Dixon et al. | ................ | 414/494 |
| 6,779,475 B1 | * | 8/2004 | Crane et al. | ................. | 114/258 |

\* cited by examiner

*Primary Examiner*—Ed Swinehart
(74) *Attorney, Agent, or Firm*—James T. Shepherd

(57) ABSTRACT

A system operable by a single workman safely launches and recovers an unmanned undersea vehicle (UUV) using a motor-driven carriage to transport the UUV to the water. The UUV is fitted to a reconfigurable sabot. An elevating ramp on the carriage supports the sabot and UUV on an elongate conveyer assembly having inclined rollers aligned with motor-driven belts to selectively outwardly and inwardly displace the UUV between the carriage and the water. Hinge members are used to rotatably connect the elevating ramp to the carriage, and a lifting mechanism connected to the carriage and ramp rotatably displaces the ramp about the hinge members. The rollers and belts displace the UUV on the conveyer assembly. A winch on the elevating ramp has a line connected to the UUV to lower and raise the UUV during launch and recovery operations.

18 Claims, 16 Drawing Sheets

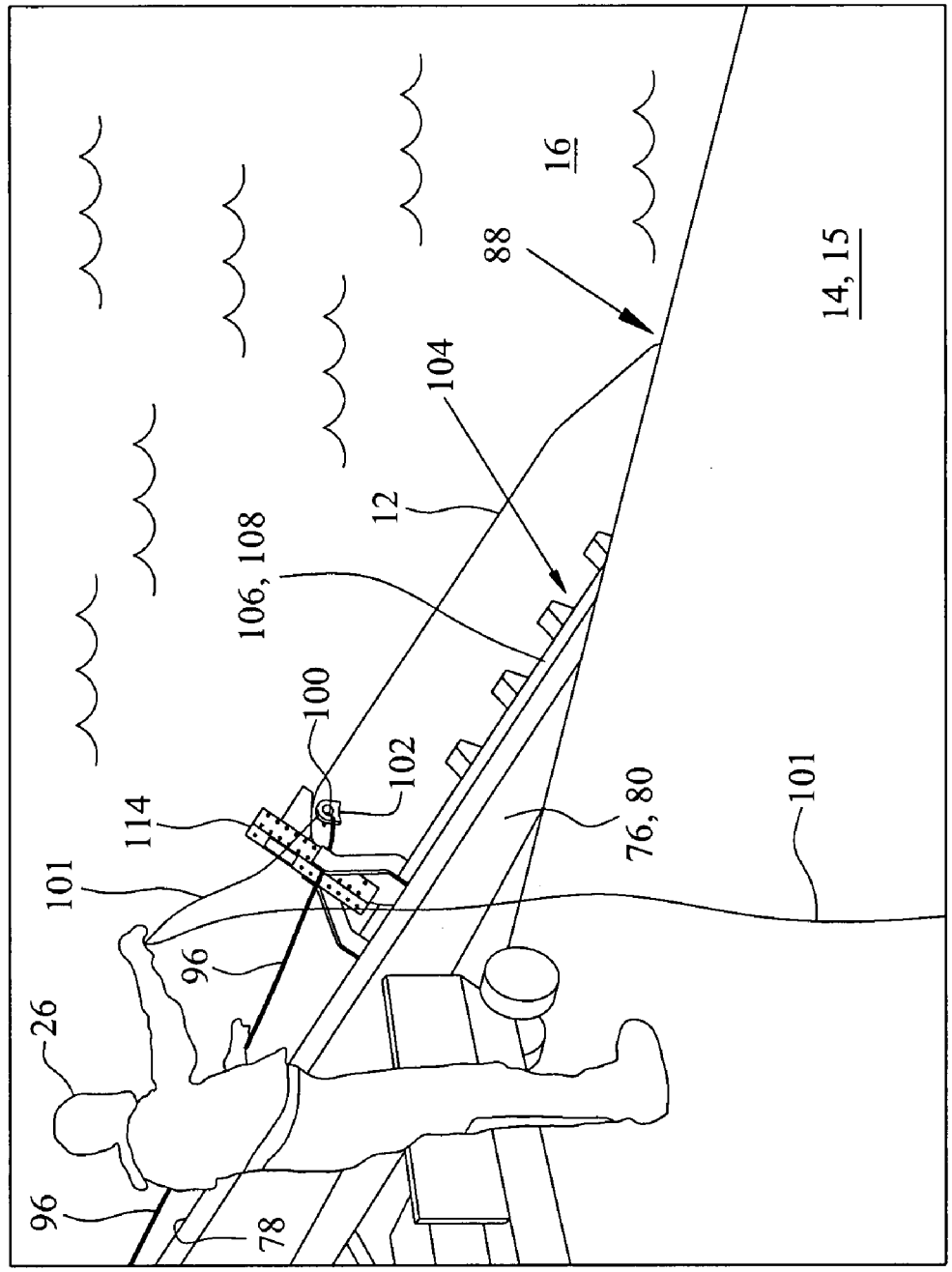

US 7,712,429 B1

LAUNCH AND RECOVERY SYSTEM FOR UNMANNED UNDERSEA VEHICLES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to system for deploying and retrieving vehicles in water. More particularly, this invention is to a portable launch and recovery system adaptable to different vehicles and platforms.

Currently, launch and recovery of an unmanned undersea vehicle (UUV) into the water from a ship or land-based launch platform relies on considerable manpower and equipment and, consequently, can be dangerous operations. During launch, the elongate, torpedo-shaped UUV is usually so heavy as to require a heavy-duty crane to lift it from the launch platform, carefully move it around until it's over the water, and slowly lower it into the water. Several workmen are needed to operate the crane and man the lines needed to guide the UUV. Even more personnel must be in a small boat in the water to bring the UUV safely into the water, detach the hoist lines, and make sure that the UUV does not impact the launch platform. During recovery, the small boat must come alongside the UUV and its crew must reattach the hoist lines and quickly get out of the way as the crane raises the UUV from the water, rotates it around, and returns it to the platform. Throughout these procedures, many workmen are involved in this hazardous activity and must be closely coordinated to avoid serious injuries and damage to the UUV. Routine adverse conditions of wind and waves add further complications to this dangerous process.

Thus, in accordance with this inventive concept, a need has been recognized in the state of the art for a system for launching and recovering different sized UUVs from different launch platforms with fewer personnel to increase safety and utilize less dangerous equipment.

SUMMARY OF THE INVENTION

The present invention provides a system and method operated by a single workman to safely launch and recover a UUV in water using a motor-driven carriage to transport the UUV to the water. An elevating ramp on the carriage supports the UUV on an elongate conveyer assembly having inclined rollers aligned with motor-driven belts to selectively move the UUV outwardly and inwardly between the carriage and the water. A sabot fits against different sizes of UUV and the inclined rollers and aligned belts to carry the UUV on the conveyer assembly. Hinge members are connected to the carriage and elevating ramp to rotatably connect the ramp and carriage, and a lifting mechanism connected to the carriage and ramp rotatably displaces the ramp about the hinge members. A winch on the elevating ramp has a line connected to the UUV to bidirectionally displace the UUV on the elongate conveyer assembly during launch and recovery of the UUV. The sabot has contoured support members to support the UUV and the sabot has rigid hollow members, nose clamp, and tail clamp selectively filled with and vented of pressurized gas to selectively engage and release the UUV during launch and recovery operations. A remote control interface module is mounted on the carriage to actuate the carriage, lifting mechanism, winch, and belts of the elongate conveyer assembly. A remote control transmits control signals to the interface module to control the carriage, lifting mechanism, winch, and belts during launch and recovery of the UUV.

An object of the invention is to provide a system and method for reducing the hazards associated with launching and recovering a UUV at a launch platform.

Another object of the invention is to provide a remotely actuated system and method for reducing the hazards associated with launching and recovering a UUV at a launch platform.

Another object of the invention is to provide a portable system and method of launching and recovering a UUV requiring a reduced number of launch personnel at a launch platform.

Another object of the invention is to provide a system and method for launching and recovering a UUV at a launch platform using a sabot to launch and recover differently sized UUVs.

Another object of the invention is to provide for launching and recovering a UUV at a launch platform using a sabot and conveyer assembly rotated on a carriage to extend downward into the water to launch and recover UUVs of different sizes.

These and other objects of the invention will become more readily apparent from the ensuing specification when taken in conjunction with the appended claims.

BRIEF DESCRIPTION OF THE DRAWINGS

FIG. 10 shows the elongate elevating ramp further inclined and the UUV being moved down the conveyer assembly by the line and belts.

DESCRIPTION OF THE PREFERRED EMBODIMENT

Figure 1:
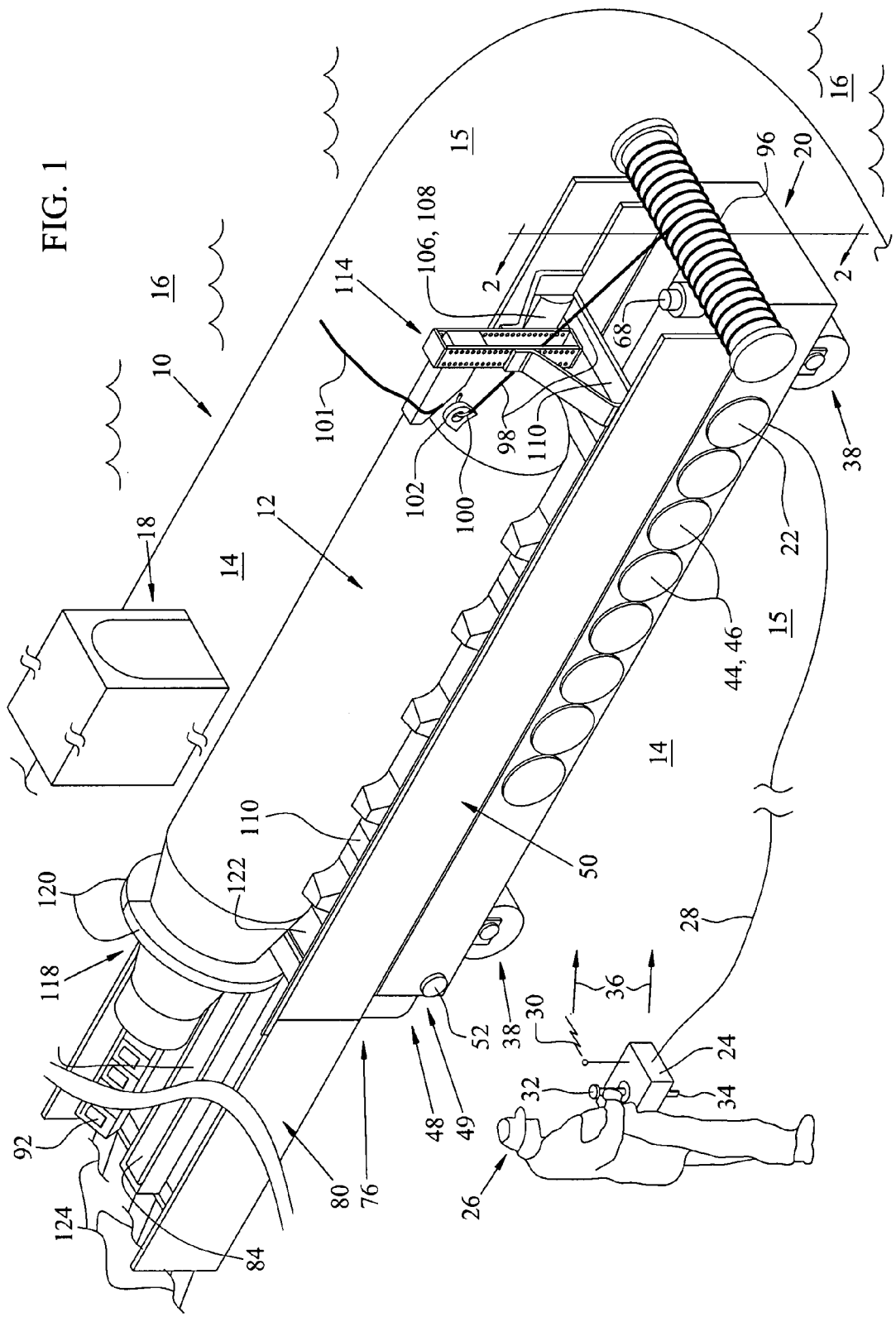
FIG. 1 is a schematic isometric view of the system for launching and recovering a UUV of the invention on a support platform such as a dock or ship.

Referring to FIG. 1, system 10 of the invention for launching and recovering an unmanned underwater vehicle (UUV) 12 is shown transporting UUV 12 across a support surface 14 to water 16. Support surface 14 can be the relatively flat top of docks or the work area on the deck at the stern of a ship 15 or other flat expanses on any of many different types of marine vessels from small craft to large ships. It is to be understood that use of the term ship as referred to herein is intended to include any and all of the different types of marine vessels that can have at least one support surface 14 that can receive and support system 10. Typically, support surface 14 can extend from a supply or storage bay 18 that can house UUV 12, and surface 14 can be at varying heights above the surface of water 16.

One of the advantages of launch and recovery system 10 of the invention is its unique carriage 20 that does much to do away with the excessive number of support personnel and heavy crane/equipment that are otherwise used in conventional launch and recoveries of UUVs. Carriage 20 of launch and recovery system 10 is a heavy duty box-shaped structure capable of bearing the load of torpedo-shaped UUV 12 that can weigh as much as 5000 pounds and extend as much as 20 feet in length. In the preferred embodiment, carriage 20 is substantially fabricated from heavy metal. This assures that the load of UUV 12 and other hardware of system 10 is adequately supported, and that the mass of carriage 20 helps to stabilize and counterweights UUV 12 as it is transported, launched and recovered.

Carriage 20 has a remote control interface module 22 schematically depicted in FIG. 1 as being on one side. Interface module 22 is activated by a remote control 24 operated by a single workman or operator 26 spaced away from carriage 20 on surface 14 or at some other convenient vantage point. Operator 26 is separated a safe distance from carriage 20 and UUV 12 but is near enough to oversee and control the procedure of launch/recovery of UUV 12 via a wire link 28 and/or radio link 30 communicating with interface module 22. Remote control 24 can have a joy-stick 32 and trigger 34 or similar uncomplicated arrangements of a few switches and/or buttons to enable the initiation of appropriate control signals (shown as arrow 36) by operator 26. These control signals 36 can actuate integral components to be described below on carriage 20 to perform the mechanical operations necessary for launch/recovery of UUV 12. Since control signals 36 are initiated by the single operator 26 from a safe distance away from the activity of launch and recovery, system 10 of the invention eliminates a major hazard otherwise associated with these dangerous activities.

Figure 2:
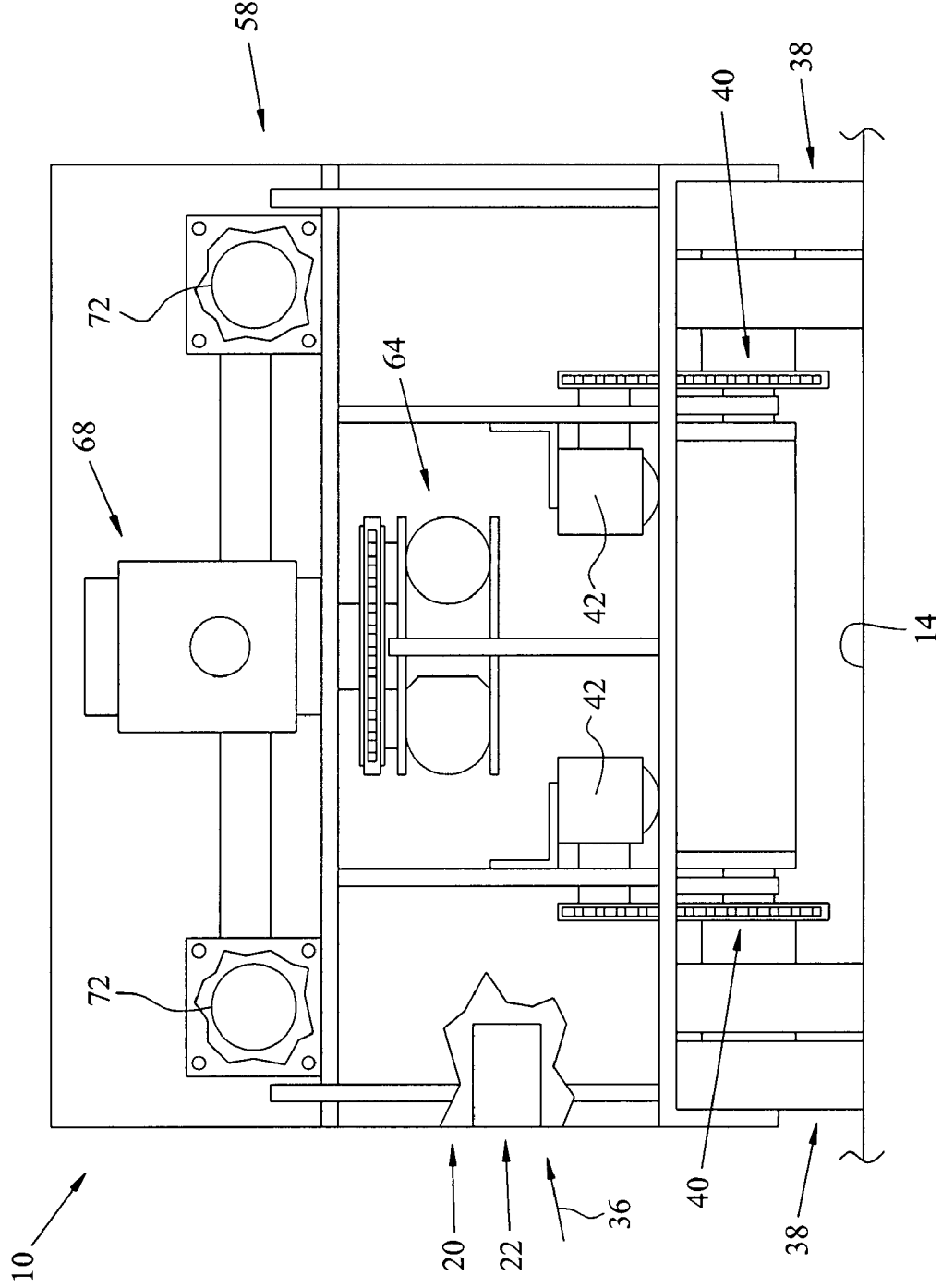
FIG. 2 is a schematic end view partially in cross section of the carriage of the system for launching and recovering a UUV generally taken along line 2-2 in FIG. 1.
Figure 3:
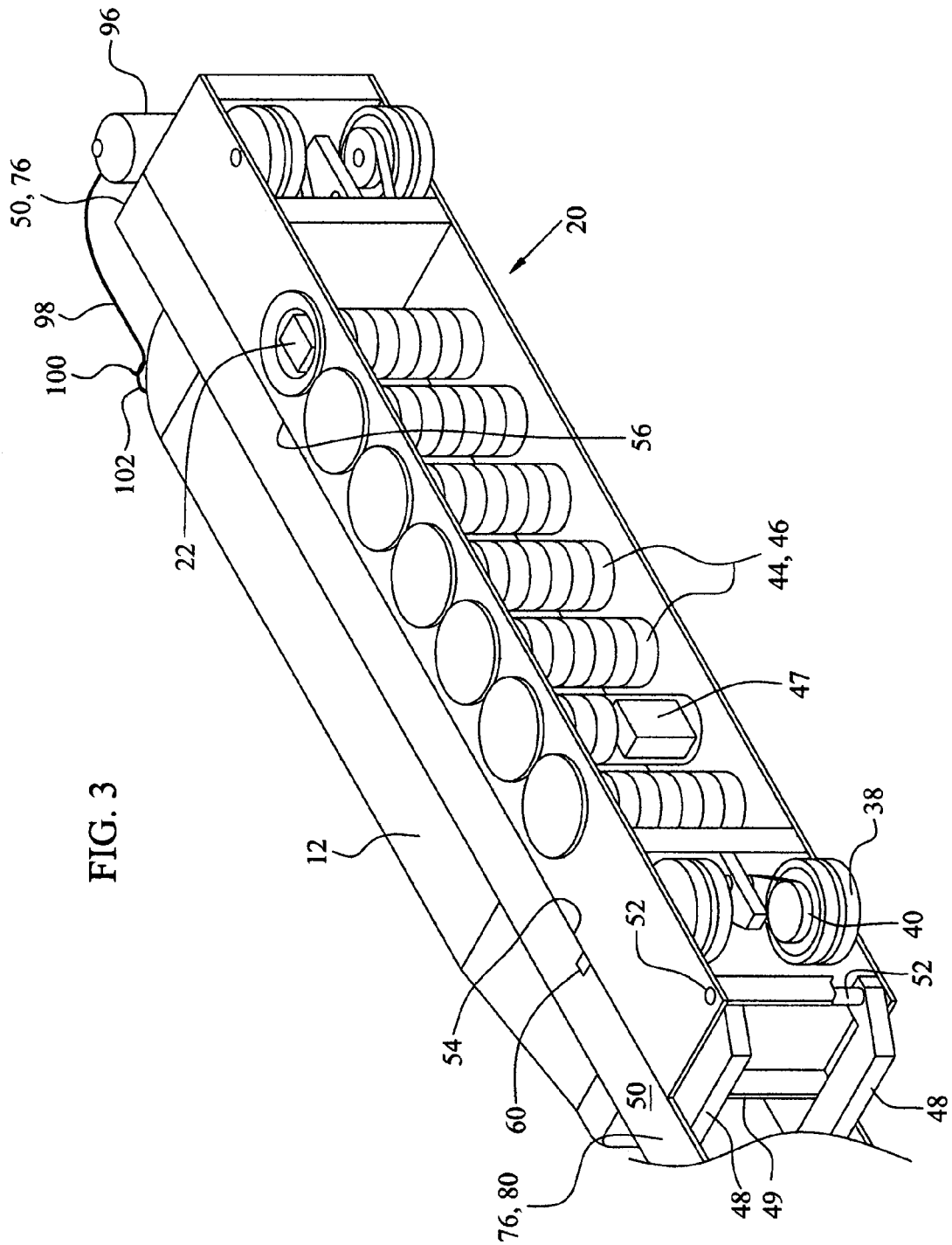
FIG. 3 is an schematic isometric underside view showing details of the carriage.

Referring also to FIGS. 2 and 3, carriage 20 has a set of dual wheels 38 in a journal mount at each bottom corner to bear the load of UUV 12 and system 10. Each dual wheel set 38 is connected to a gear-and-drive-chain mechanism 40 connected to a drive motor 42 electrically coupled to batteries 44 in sealed housings 46 and is capable of being bidirectionally rotated. At least one battery charger 47 is connected to batteries 44 for recharging them from a remote power source as needed.

Appropriate control signals 36 received at interface module 22 control the connection of responsive amounts of power from batteries 44 to each drive motor 42 for each motor's selective actuation. This actuation of each drive motor 42 causes the interconnected gear-and-drive-chain mechanism 40 to selectively rotate each interconnected wheel set 38 to not only propel carriage 20 and UUV 12 across support surface 14, but when different amounts of electrical power are selectably coupled to different ones of the wheel sets 38 by control signals 36, carriage 20 can be remotely steered and maneuvered across the support surface as well. Carriage 20 has its internal electronic, electro-mechanical and mechanical components robustly fabricated and packaged to survive and function reliably when system 10 of the invention is subjected to the ambient influences of water, shocks, vibrations, etc. routinely expected in the harsh marine environment.

Carriage 20 has a pair of hinge members 48 connected to and between the outboard end 49 of carriage 20 and an elongate elevating ramp 50. Hinge members 48 rotatably couple carriage 20 and elevating ramp 50 together via a heavy duty pin 52 that laterally extends through hinge members 48 and between the opposite sides of carriage 20 to permit a downward and upward rotation of ramp 50 to and from carriage 20. A lower side 54 of elevating ramp 50 abuts an upper side 56 of carriage 20 to support the load of UUV 12 when elevating ramp 50 is in the down position. When elevating ramp 50 is in an upwardly rotated position during launch or recovery, heavy duty lateral pin 52 of elevating ramp 50 supports a considerable portion of the load of UUV 12.

Figure 4:
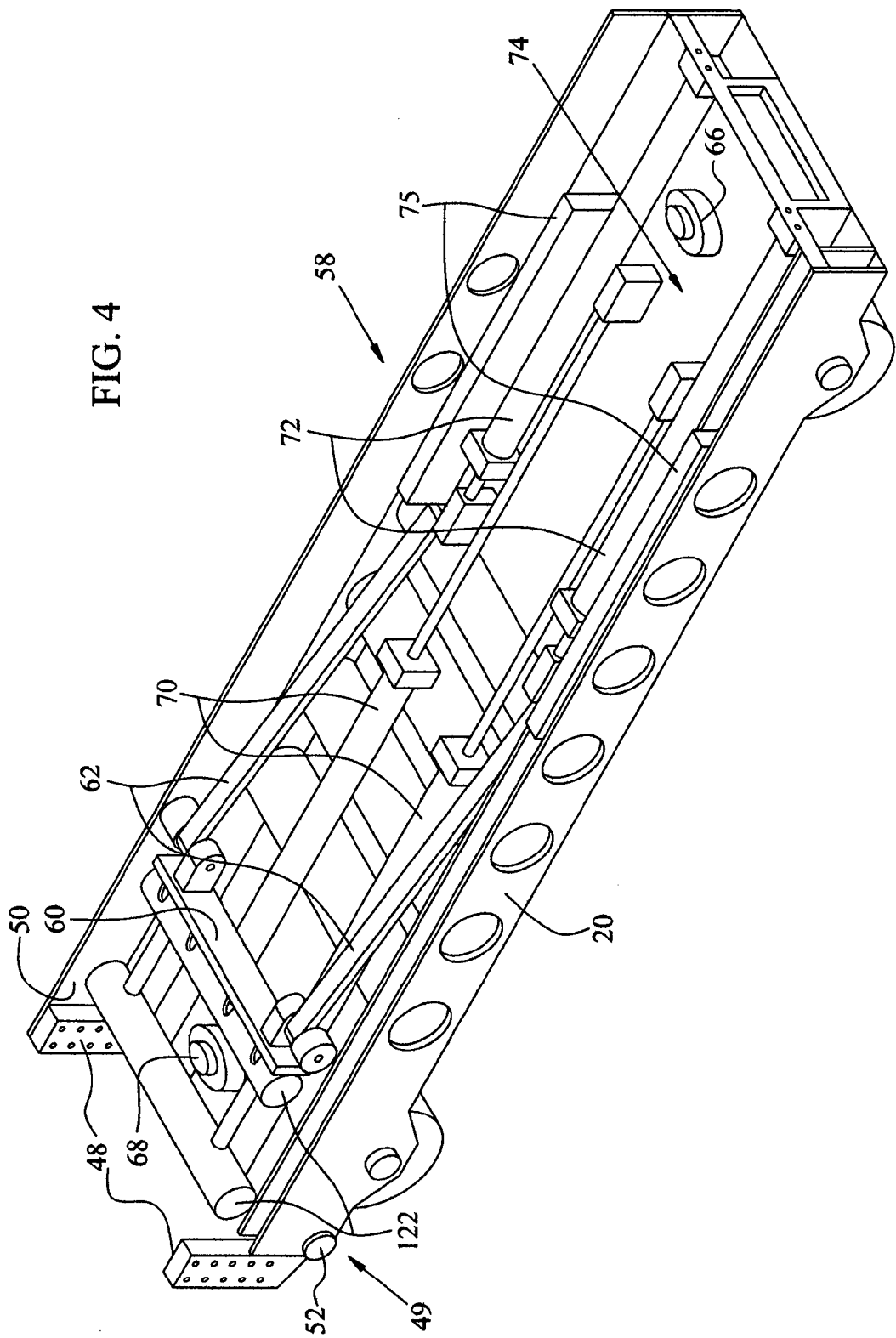
FIG. 4 is an isometric top view partially in cross section of the lifting mechanism on the carriage.

Referring additionally to FIG. 4, a lifting mechanism 58 is mounted on carriage 20 and is connected to elevating ramp 50 by a lateral coupling bar 60 connected to a pair of heavy duty lift arms 62. Hydraulic pump motors 64 of lifting mechanism 58 are mounted in carriage 20 at its opposite ends (only one such motor being shown in FIG. 2, it being understood that another hydraulic pump motor is at the opposite end inside of carriage 20). Each hydraulic pump motor 64 is electrically coupled to batteries 44 in sealed housings 46. Appropriate control signals 36 received at interface module 22 are used to connect appropriate amounts of power from batteries 44 to each hydraulic pump motor 64 for selective simultaneous actuation of a separate mechanically interconnected hydraulic pump 66 and 68 of lifting mechanism 58. Hydraulic pumps 66 and 68 are each connected to simultaneously hydraulically displace first and second pairs of hydraulic rams 70 and 72 of lifting mechanism 58 in responsive simultaneous extending or retracting displacements as determined by control signals 36.

First pair of hydraulic rams 70 is connected at their base ends to carriage 20 and their displaceable shaft ends to a sliding plate member 74. Second pair of hydraulic rams 72 is also connected at their base ends to carriage 20 and their displaceable shaft ends to sliding plate member 74. Sliding plate member 74 is retained on opposite sides in carriage 20 by longitudinally extending roller tracks 75 that only permit bidirectional longitudinal displacement of plate member 74 in carriage 20. Sliding plate member 74 is pivotally connected to one end of lift arms 62 that are joined at their opposite ends to a lateral coupling bar 60.

First and second pairs of hydraulic rams 70 and 72 are simultaneously actuated by control signals 36 at control interface module 22 to simultaneously generate additive pushing and pulling forces to displace sliding plate member 74. In other words when control signals 36 cause second set of rams 72 to forcefully extend their plungers simultaneously with first set of rams 70 being controlled to forcefully retract their plungers, rams 70 and 72 respectively exert simultaneous additive pushing and pulling forces on sliding plate member 74 that displace member 74 between roller tracks 75 toward hinge members 48. This forceful displacement of sliding plate member 74 is transmitted to elongate elevating ramp 50 via lift arms 62 and lateral coupling bar 60 to rotate ramp 50 about lateral pin 52 of hinge members 48. Ramp 50 can be selectively rotated up to eighty degrees on pin 52 as ramp 50 is raised upward above carriage 20.

When control signals 36 cause first set of rams 70 to forcefully extend their plungers simultaneously with second set of rams 72 being controlled to forcefully retract their plungers, rams 70 and 72 respectively exert simultaneous additive pushing and pulling forces on sliding plate member 74 that displace member 74 between roller tracks 75 in the opposite direction away from hinge members 48. This forceful displacement of sliding, plate member 74 in the opposite direction is transmitted to elongate elevating ramp 50 via lift arms 62 and lateral coupling bar 60 to oppositely rotate ramp 50 about lateral pin 52 of hinge members 48 in the opposite direction. Ramp 50 can be selectively rotated from its position above carriage 20 and lower ramp 50 from above carriage 20 downward to a position on carriage 20.

First set of rams 70 and second set of rams 72 are simultaneously actuated to enable the transfer of the hydraulic fluid between sets of rams 70 and 72 and reduce the total amount of hydraulic fluid that may be required in system 10. That is to say for example, while plungers of ram set 72 are being extended by pump 68 and plungers of ram set 70 are being retracted, by pump 66 to displace sliding plate member 74 toward hinge members 48 and rotatably raise elevating ramp 50, the hydraulic fluid from rams 70 can be fed via a feed line, not shown, between pumps 68 and 66 to rams 72. Conversely, while plungers of ram set 70 are being extended by pump 66 and plungers of ram set 72 are being retracted by pump 68 to displace sliding plate member 74 away from hinge members 46 and rotatably lower elevating ramp 50, the hydraulic fluid from rams 72 can be fed via a feed line between pumps 68 and 66 to rams 70. This shared use of the hydraulic fluid between sets of rams 70 and 72 reduces the volume of fluid that might otherwise be needed by separated individual rams and contributes to reducing the size of reservoirs for such fluid. In fact, using fresh water having a little soap added has proven to be an effective environmentally friendly hydraulic fluid that avoids formation of algae in the hydraulics associated with lifting mechanism 58. Thus, selective actuation of lifting mechanism 58 with remotely originating control signals 36 causes a responsive rotational raising or lowering of elevating ramp 50 and UUV 12 without overly exposing the operator to danger. In accordance with this invention, a suitable lifting mechanism 58 could also be any of many different mechanical arrangements capable of rotating and elevating ramp 50 from carriage 20 other than the hydraulic lift mechanism described.

Figure 5:
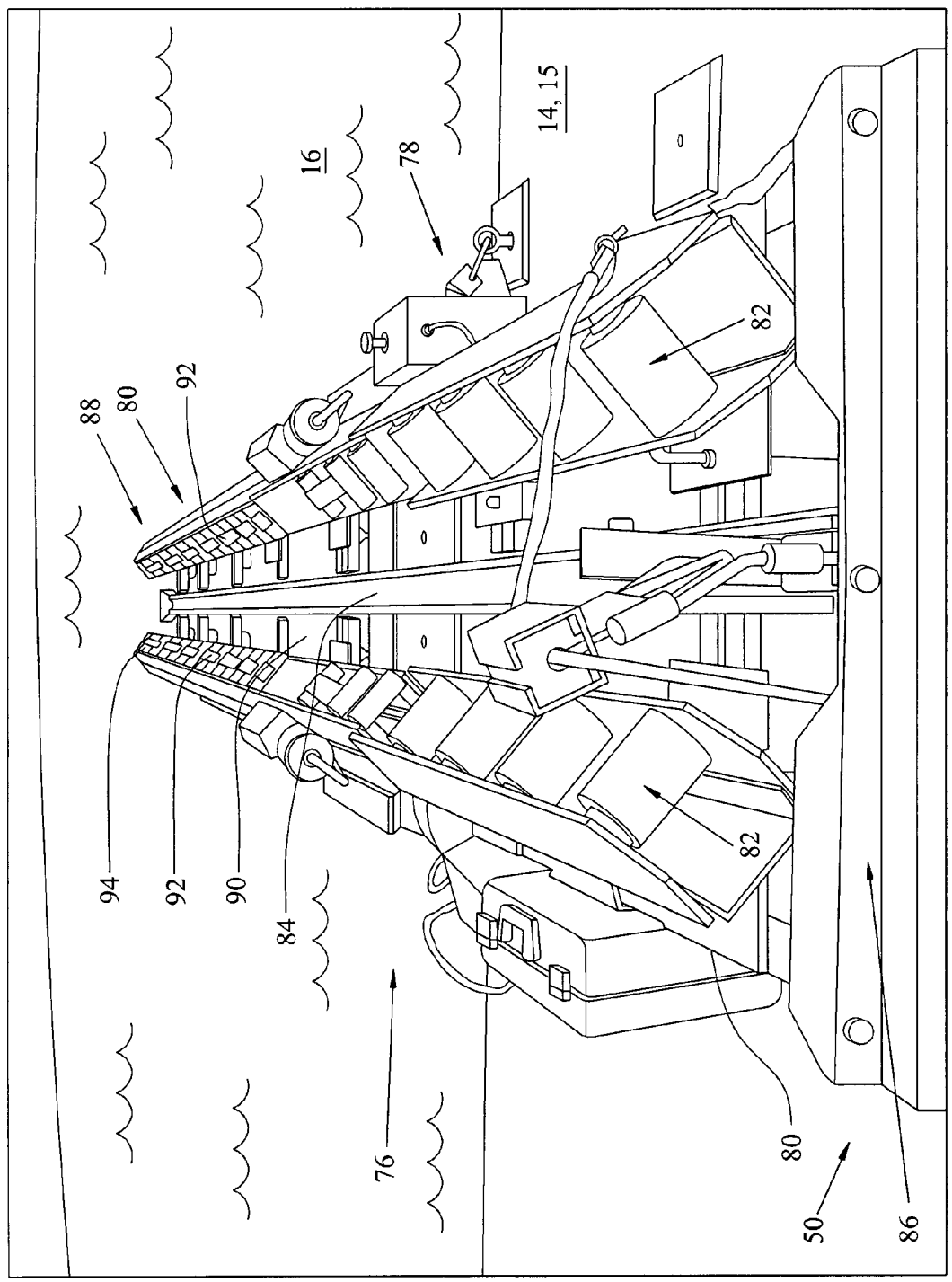
FIG. 5 is an inboard end view of the elongate conveyer assembly of the elevating ramp for guiding and supporting the UUV during launch and recovery.

Referring additionally to FIG. 5, elevating ramp 50 includes an elongate conveyer assembly 76 that guides and supports UUV 12 during launch and recovery. Elongate conveyer assembly 76 can be integrally formed with elevating ramp 50 or can be bolted or welded onto, or otherwise securely made a part of, elevating ramp 50 so that launch and recovery of UUV 12 can proceed reliably without creating undue destabilizing forces and moments. Elongate conveyer assembly 76 includes an inboard portion 78 that extends from hinges 48 along the length of carriage 20 and an outboard portion 80 that extends in the opposite direction from hinges 48. Two series of rollers 82 inclined at an angle of about 45 degrees are mounted on the upper side of inboard portion 78, and a motor-driven center belt 84 longitudinally extends from the inner end 86 of inboard portion 78 to the outer end 88 of outboard portion 80 along the bottom 90 of elongate conveyer assembly 76. Motor driven side belts 92 are supported in longitudinal guide structures 94 that longitudinally extend on opposite sides of outboard portion 80, and each side belt 92 and separate guide structure 94 are disposed in an aligned relationship with a separate series of inclined rollers 82.

Motor driven center belt 84 and motor driven side belts 92 are connected to appropriately connected belt drive motors (not shown) in assembly 76 to selectively longitudinally displace central and side belts 84 and 92 in outward and inward directions. The belt drive motors are coupled to batteries 44 and remote control interface module 22 to respond to appropriate control signals 36 received at interface module 22 to couple appropriate amounts of power from batteries 44 to each belt drive motor for selective actuation of belts 84 and 92. This selective actuation can simultaneously displace belts 84 and 92 to carry UUV 12 in either direction along the length of outboard portion 80 of conveyer assembly 76 during launch and recovery. When UUV 12 traverses inboard portion 78, center belt 84 alone moves UUV 12 along in this stretch of conveyer assembly 76.

Referring again to FIG. 1, an electric powered winch 96 is mounted on the end of elongate elevating ramp 50. Winch 96 is coupled to batteries 44 and interface module 22 to reel out or reel in a high tensile strength line 98 when appropriately controlled by remotely originating control signals 36. Line 98 can be made from any of a considerable number of suitable commercially available fibers secured at its distal end to a coupling hook 100 connected to a pad eye 102 on the nose of UUV 12. Coupling hook 100 can be selectively unlatched to an open position, for example, by tugging on an interconnected tether line 101. Winch 96 and line 98 are robustly made to selectively reel out and reel in line 98 and handle the load of UUV 12 when elevating ramp 50 is elevated as described below during deployment and retrieval of UUV 12. Winch 96 can be controlled by control signals 36 to support the load of UUV 12 as UUV 12 traverses the length of elongate conveyer assembly 76 during launch and recovery or can be appropriately controlled to share the load of UUV 12 along with belts 84 and 92.

Elongate conveyer assembly 76 of elongate elevating ramp 50 of system 10 is sized to accommodate one size of UUV 12. Selective actuation of winch 96 can deploy line 98 connected to UUV 12 and the appropriately spaced-apart inclined rollers 82, center belt 84 and side belts 92 can fit about this one size to guide it during launch and recover. Other smaller dimensioned UUVs would not be safely secured and the consequent loose fitting may allow jarring random motions and impacts that may affect reliability. In accordance with this inventive concept, the process of launch and recovery of UUV 12 is further improved upon by including an elongate sabot 104 that is sized to fit against inclined rollers 82 and side belts 92 in an elongate abutting contact and fit against different sizes of UUVs 12 to engage and carry UUV 12.

Figure 6:
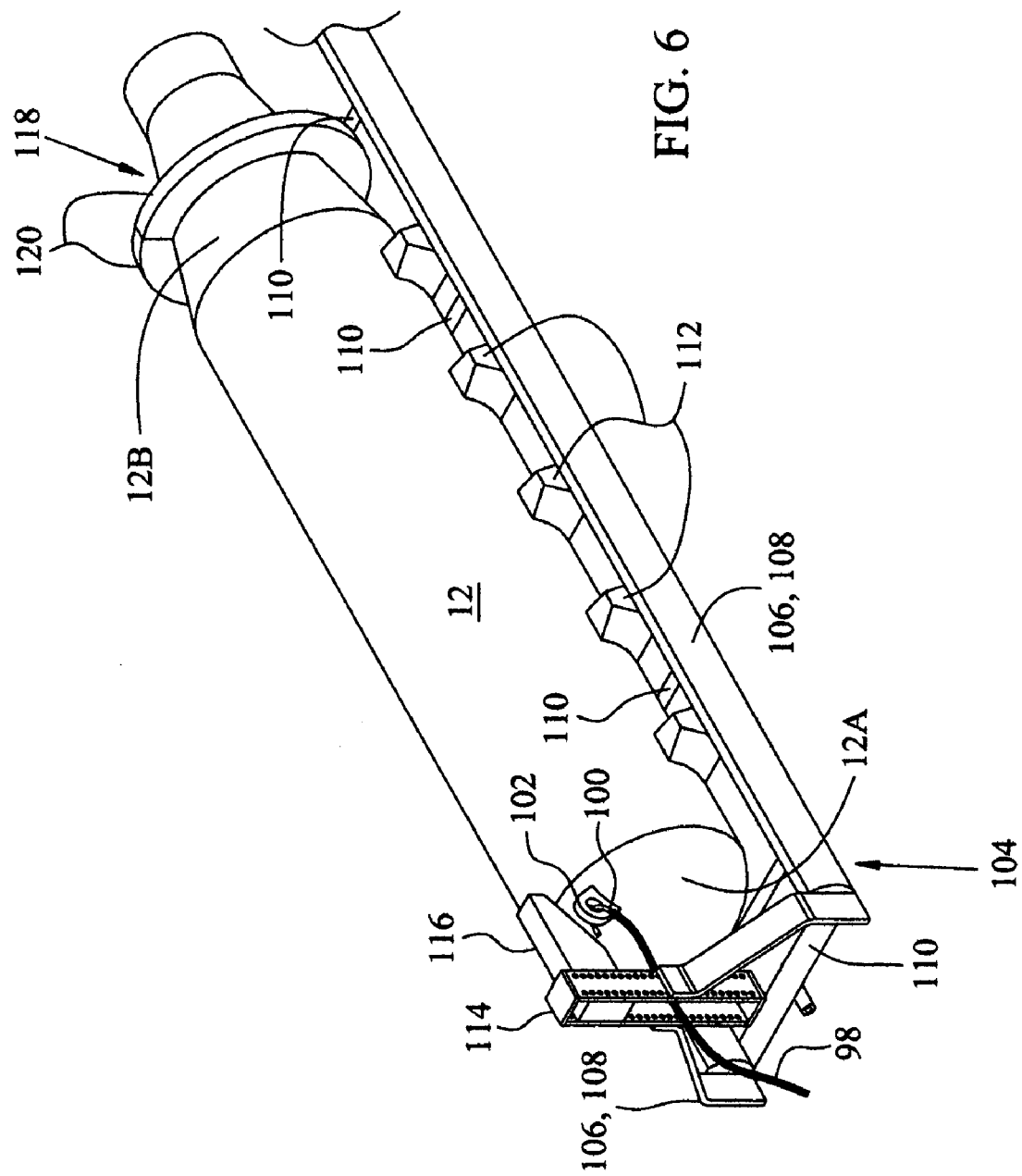
FIG. 6 is an isometric schematic view of the sabot for holding a UUV on the carriage.

Referring also to FIG. 6, elongate sabot 104 has a pair of rigid hollow members 106 defining a pair of elongate chambers 108. Rigid hollow members 106 are laterally spaced apart to fit between and rest against or on inclined rollers 82 and side belts 92 while the bottom of UUV 12 rests on center belt 84. Several lateral members 110 are provided between rigid hollow members 106 to hold them apart and maintain structural integrity while they rest on central belt 84. A number of bottom support members 112 on both of members 106 are contoured to fit against or accommodate the shape of the selected UUV 12. Contoured support members 112, and lateral members 110, cradle and support UUV 12 on carriage 20 and while UUV 12 is being launched and recovered. A rigid upwardly extending frame 114 is securely connected to hollow members 106 on one end of sabot 104 and positions and holds an air powered pressurized nose clamp 116. Nose clamp 116 is shaped to fit against and be clamped onto nose portion 12A of UUV 12 when appropriately actuated to be filled with pressurized gas. An air powered pressurized tail clamp 118 having a pair of pivotable arc-shaped members 120 is provided at the opposite end of sabot 104. Arc-shaped members 120 are shaped to fit around and against tail portion 12B of UUV 12 and be clamped onto it when appropriately filled with pressurized gas. When nose portion 12A of UUV 12 is abutting against and held by nose clamp 116 and arc-shaped members 120 are rotated closed in abutting contact to hold the tail portion 12B of UUV 12, UUV 12 is securely held and retained in sabot 104. This secure contact is needed, for example, during transport of UUV 12 across support surface 14 or during early stages of launch and later stages of recovery of UUV 12. When nose portion 12A of UUV 12 abutting nose clamp 116 is depressurized and arc-shaped members 120 are depressurized and rotated open to remove contact with tail portion 12B of UUV 12, UUV 12 can be free from sabot 104 during, for example, the final stages of the launch of UUV 12.

In accordance with this inventive concept, rigid hollow members 106, lateral members 110, contoured support members 112, rigid upright frame 114, nose clamp 116, and arc-shaped members 120 of air powered tail clamp 118 of sabot 104 can be re-dimensioned and re-configured to accommodate and safely launch and recover a wide variety of different dimensioned UUVs.

Air powered nose clamp 116 and air powered tail clamp 118 are coupled to a pair of valve-actuated pressurized gas tanks 122 on carriage 20, see also FIGS. 1 and 4, via gas supply lines (not shown). Air powered nose clamp 116 and air powered tail clamp 118 are coupled to interface module 22 on carriage 20 to be selectively actuated by appropriate ones of remote control signals 36. Control signals 36 from remote control 24 cause control interface module 22 to control the flow of pressurized gas from pressurized gas tanks 122 to rotate nose clamp 116 and arc-shaped members 120 of tail clamp 118 closed to hold UUV 12 in sabot 104 during recovery for example, or to rotate nose clamp 116 and arc-shaped members 120 open to free UUV 12 from sabot 104 during launch.

Referring again to FIG. 1, operation of launch and recovery system 10 of the invention is initiated by a single operator 26 generating control signals at remote control 24 to bring a designated UUV 12 from a storage bay 18 at dockside or on an ocean going ship. Because launch and recovery system 10 of the invention is compact and self-contained, it can be quickly air-transported or carried by rail or truck from a remote supply depot to where it is needed without requiring ancillary equipment. The right UUV 12 for the job can be mounted in sabot 104 on carriage 20 of system 10 at the remote depot, or system 10 and UUV 12 can be shipped separately and UUV 12 can be mounted on system 10 at the work site.

Figure 7:
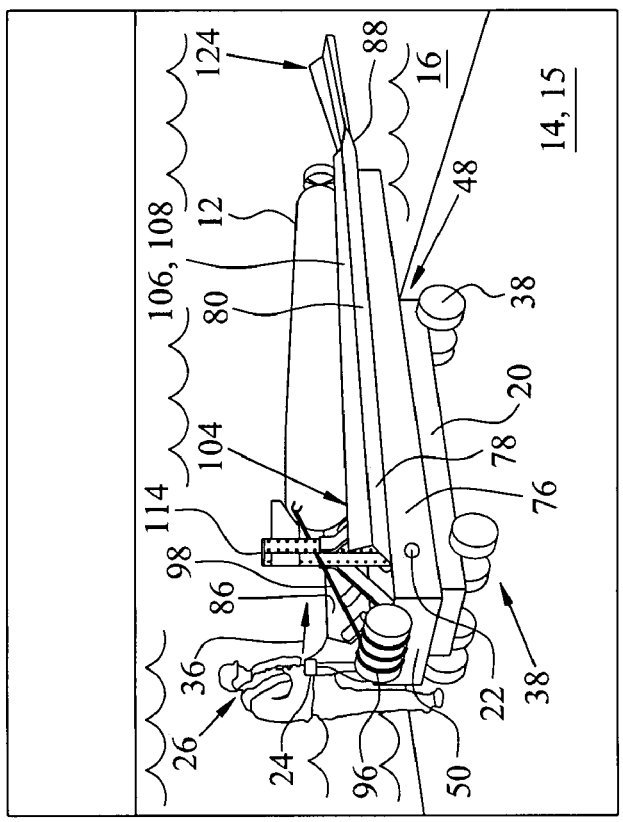
FIG. 7 is an isometric view of the launch and recovery system at the water's edge prior to launch of the UUV.

Launch of UUV 12 systematically progresses in a controlled sequence schematically depicted in FIGS. 7 through 12 when taken in conjunction with the structure of launch and recovery system 10 of FIGS. 1 through 6. In FIG. 7 operator 26 appropriately operates remote control 24 to emit appropriate control signals 36 for control interface module 22 to activate drive motors for wheel sets 38 to propel and steer self-propelled carriage 20 across and to the edge of support surface 14 on ship 15. UUV 12 can be located on elongate conveyer assembly 76 of elevating ramp 50 to distribute at least some of its weight on opposite sides of hinge members 48 to reduce the amount of force needed to rotate ramp 50, conveyer assembly 76, and UUV 12 by lifting mechanism 58. Optionally, UUV 12 and sabot 104 could be located further to the left on conveyer assembly 76 and ramp 50 as shown in FIG. 7 as UUV 12 is being transported across surface 14 to the water's edge, and when carriage 20 arrives at the position shown, motor driven belts 84 and 92 can be actuated to move sabot 104 and UUV 12 to the right on conveyer assembly 76 on ramp 50.

Figure 8:
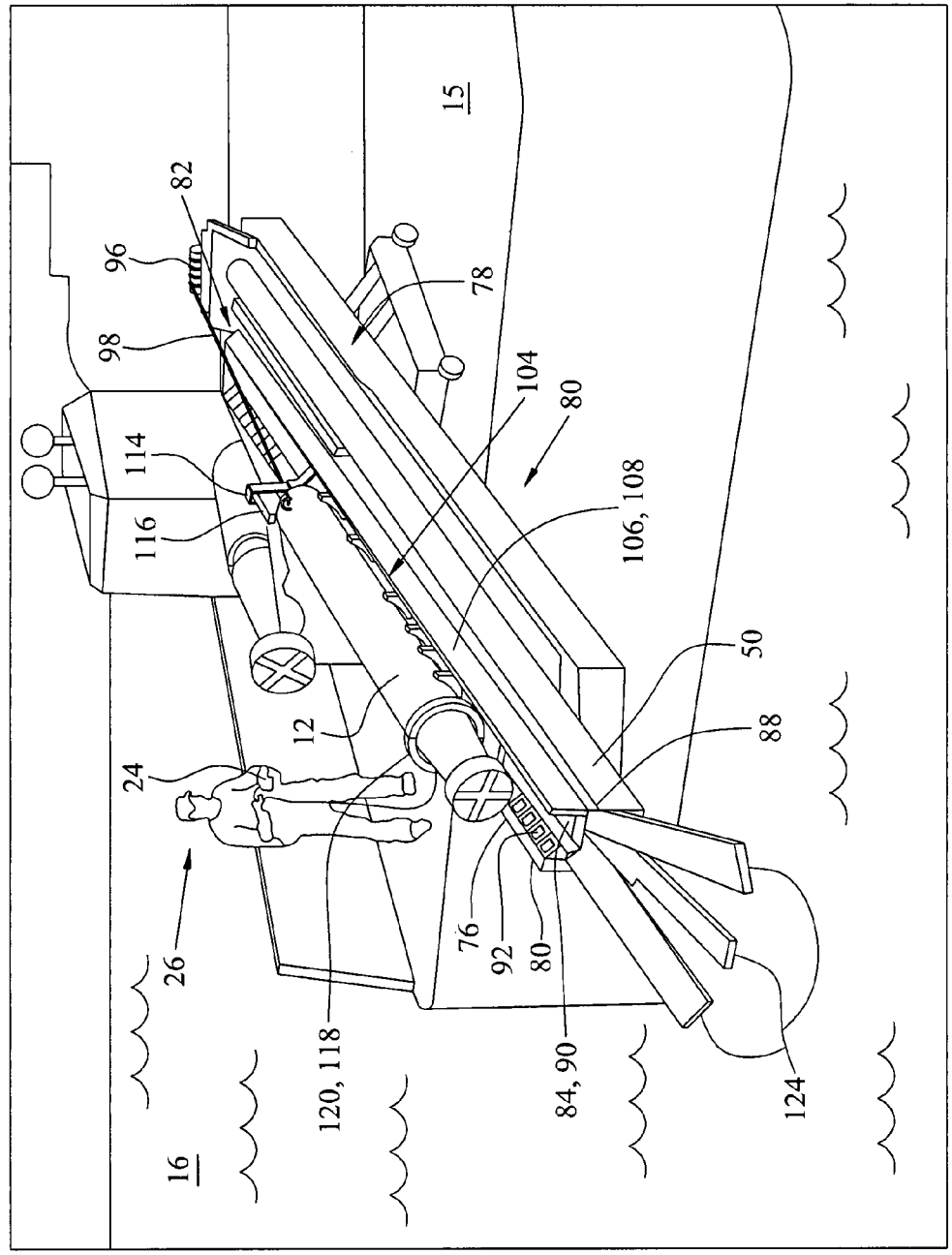
FIG. 8 shows the elongate elevating ramp being partially rotated by the lifting mechanism system during an early stage of launch of the UUV.

Referring also to FIG. 8, the next step in launch of UUV 12 has lifting mechanism 58 activated by control signals 36 to partially rotate and incline ramp 50, conveyer assembly 76, sabot 104 and UUV 12 to the position shown. Line 98 extending from winch 96 through upright frame member 114 of sabot 104 and connected to pad eye 102 on UUV 12 via hook 100 exerts a sufficient tensile force to prevent gravity from moving UUV 12 down the inclined conveyer assembly 76. Frictional engagement of UUV 12 by belts 84 and 92 also creates a frictional force to resist this downward motion and further holds UUV 12 on conveyer assembly 76 and ramp 50.

Figure 9:
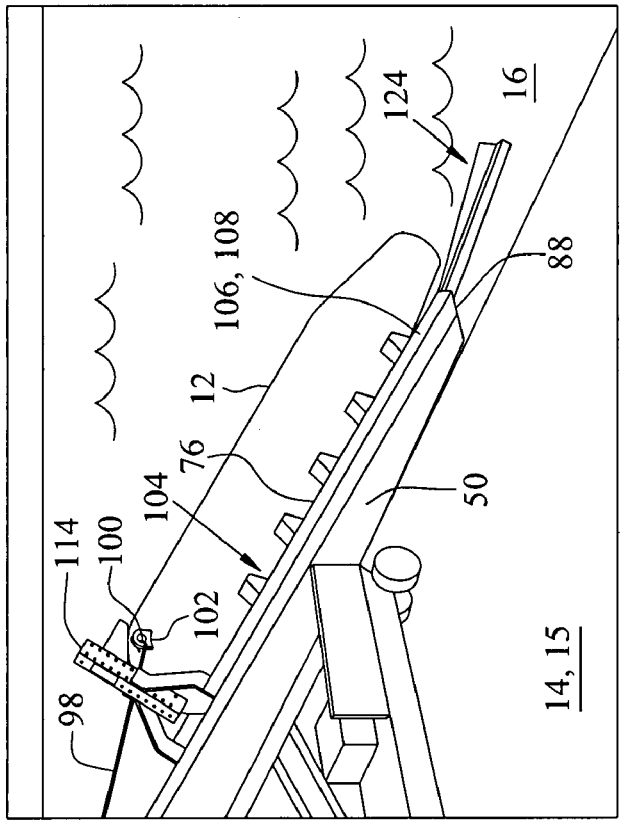
FIG. 9 shows the elongate elevating ramp during launch further rotated by lifting mechanism and the UUV being held on elongate conveyer assembly by a line and belts.

FIGS. 9 and 10 also show that additional control signals 36 received at interface module 22 from remote control 24 further activate lifting mechanism 58 to further rotate and increase the incline of ramp 50 and conveyer assembly 76 holding sabot 104 and UUV 12. Virtually simultaneously, additional control signals 36 initiate winch 96 to pay out additional lengths of line 98 and further activate belt drive motors for belts 84 and 92 to longitudinally displace belts 84 and 92 along conveyer assembly 76 to carry sabot 104 and UUV 12 to and past outer end 88 of conveyer assembly 76 and into water 16.

Figure 11:
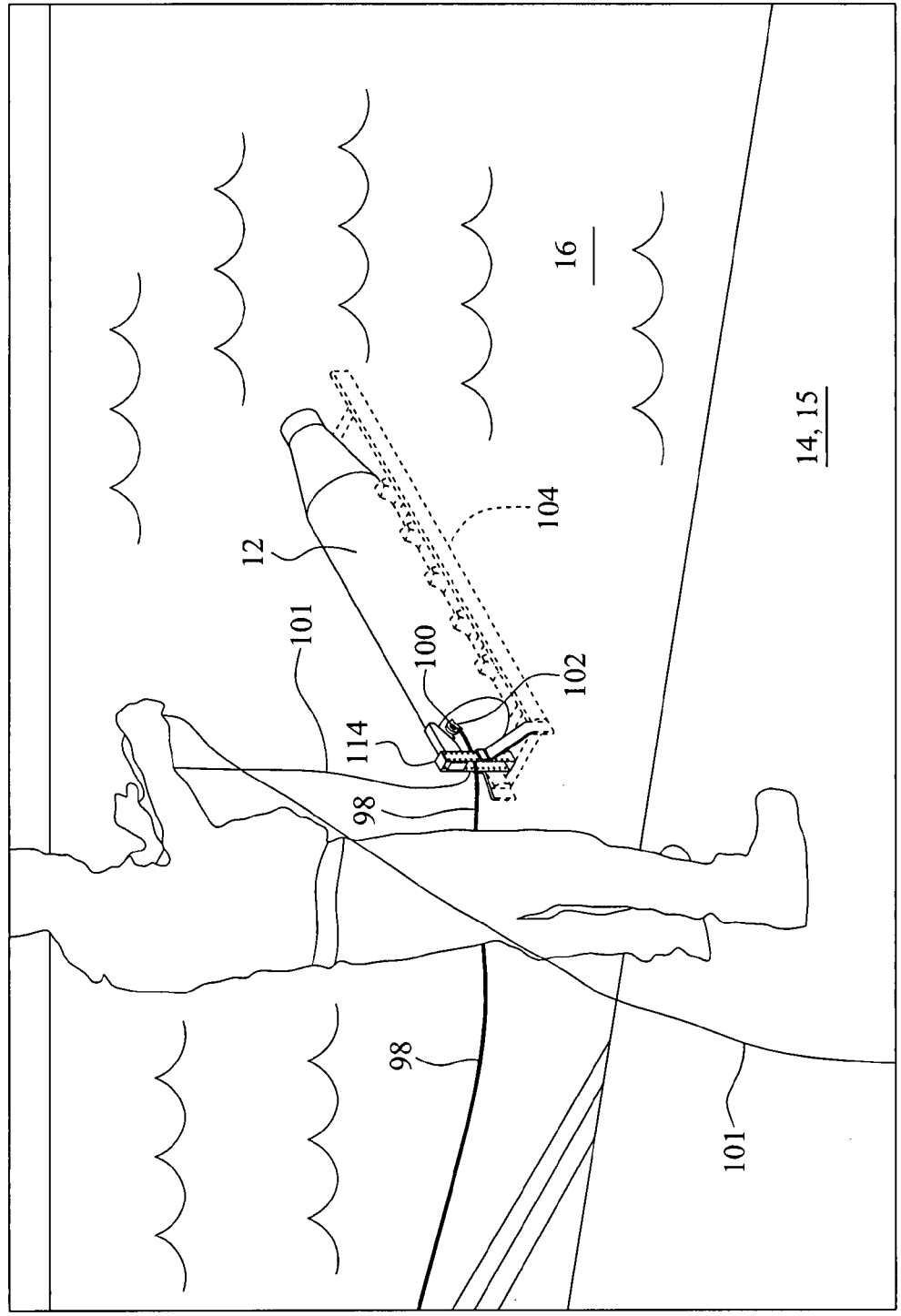
FIG. 11 shows the UUV being towed behind the ship.
Figure 12:
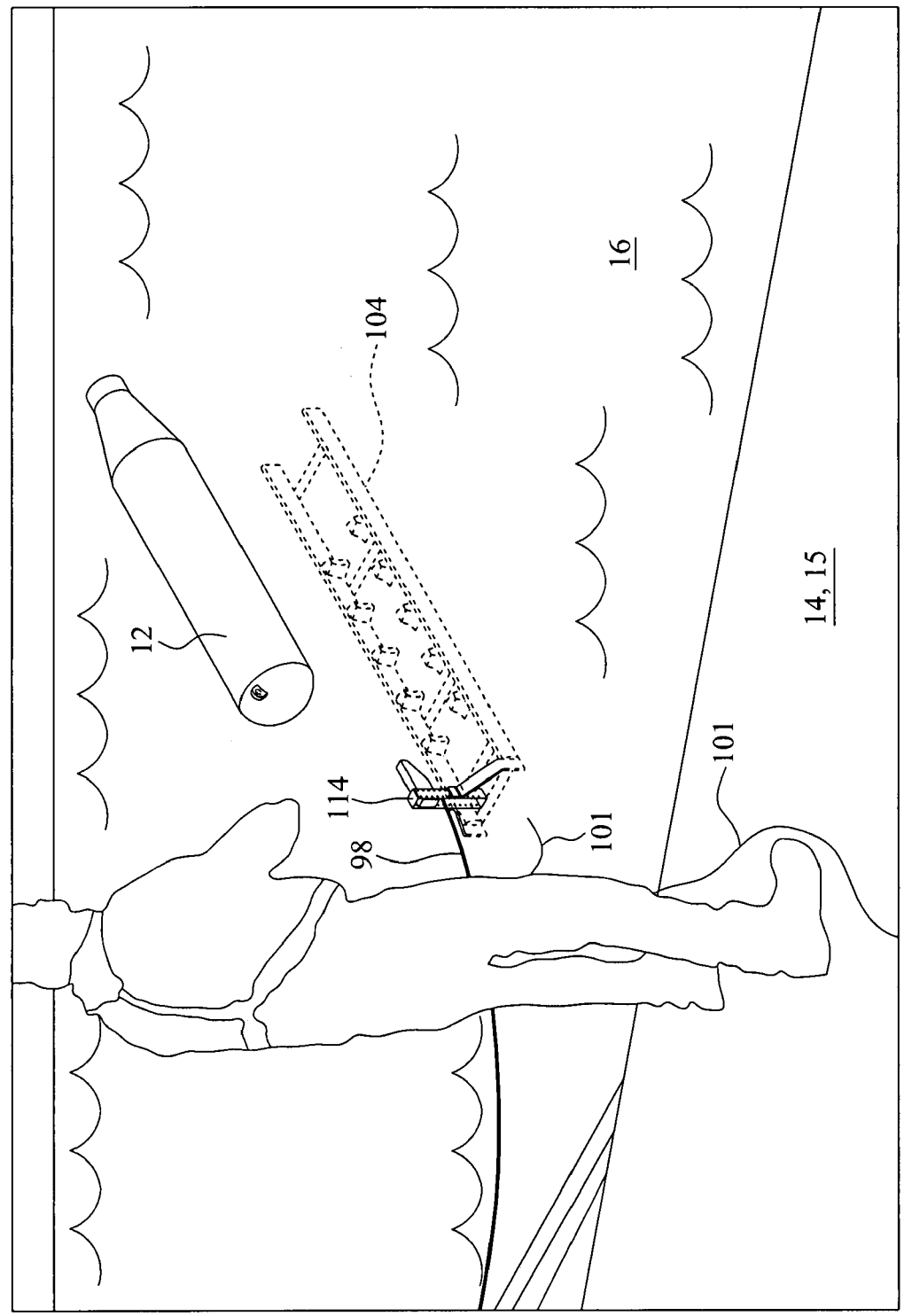
FIG. 12 shows the UUV floating free, launched from the supporting ship.

Launch of UUV 12 preferably is done while ship 15 is underway. This forward motion causes UUV 12 to trail behind in the created current, and UUV 12 begins to be towed behind shift 15 as sabot 104 and UUV 12 clear the outboard end 88 of conveyer assembly 76 and enter into water 16. While this is happening, additional appropriate control signals 36 received at interface module 22 cause pressurized gas to be vented from pressurized nose clamp 116 and pressurized tail clamp 118 to release their constrictive engagement of nose and tail portions 12A and 12B of UUV 12. These additional appropriate control signals 36 also cause pressurized gas to be vented from elongate chambers 108 in rigid hollow members 106. Sabot 104 is flooded with a portion of ambient water and sinks in water 16 to a level that is below the slightly buoyant UUV 12 as shown in FIGS. 11 and 12. Since line 98 is connected to UUV 12 and passes through frame member 114, the floating UUV 12 and at least partially submerged sabot 104 can be towed behind the stern of craft 15. Tether 101 is pulled by operator 26 or an additional helper, see FIG. 11, and hook 100 unlatches to disengage from pad eye 102 so that UUV 12 floats free, launched from ship 15, see FIG. 12. Hook 100 is dimensioned to be too large to pass through frame member 114. Therefore, hook 100 is pulled by line 98 to abut against frame member 114 to allow retrieval of sabot 104 via line 98 after UUV 12 is launched.

Figure 13:
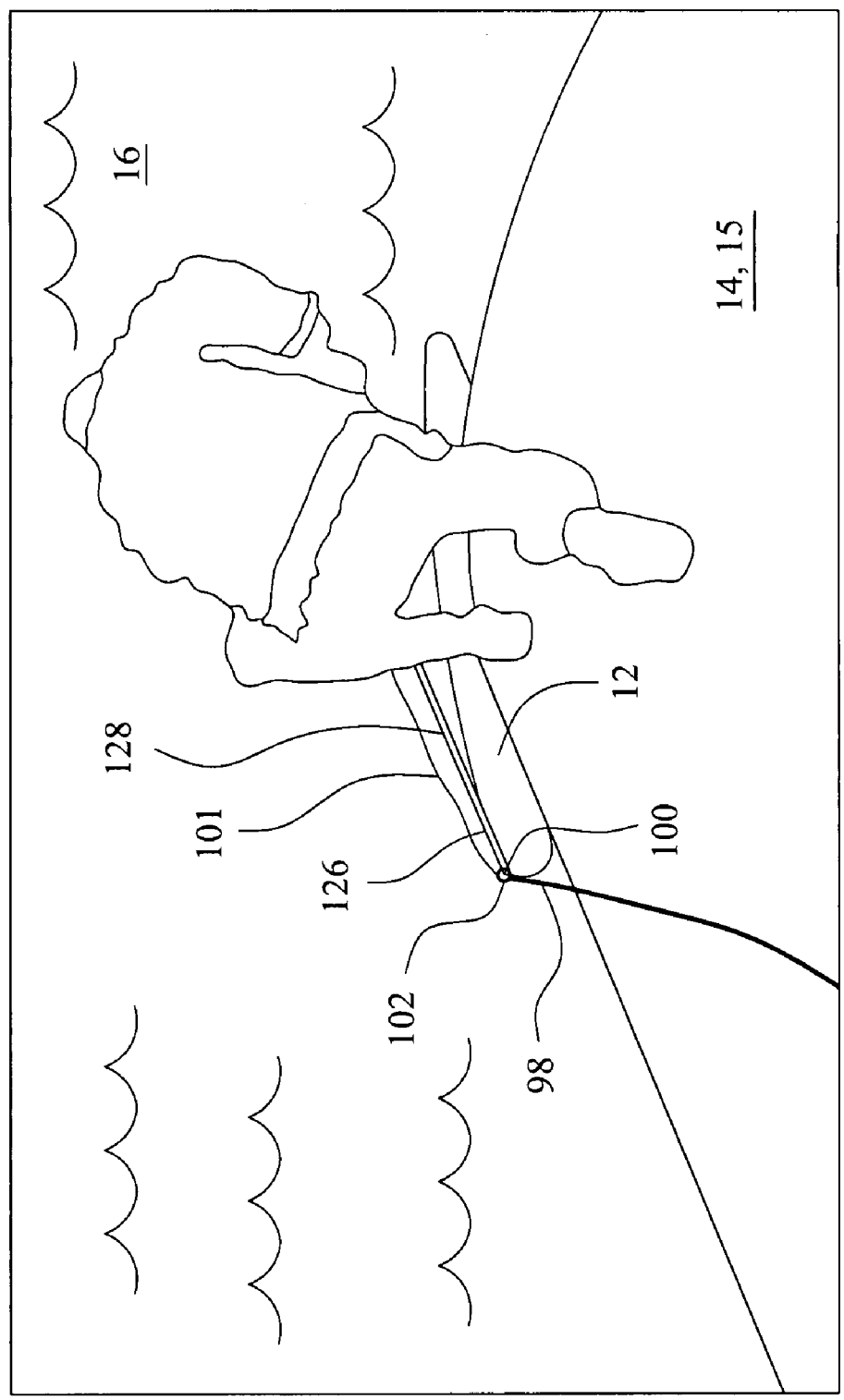
FIG. 13 shows a single operator on the support surface of a ship positioning a long handled pole and line adjacent the pad eye on the UUV during attachment at the beginning of recovery.

Recovery of UUV 12 systematically progresses in a controlled sequence schematically depicted in FIGS. 13 through 18 when taken in conjunction with the structure of launch and recovery system 10 of FIGS. 1 through 6. In FIG. 13 a single operator 26 on surface 14 of ship 15 positions the far end 126 of a long handled pole 128 adjacent pad eye 102 on UUV 12.

Unlatched or open hook 100 is connected to line 98 that has been passed through frame member 114 of sabot 104. Hook 100 is releaseably mounted on far end 126 and is brought next to and against pad eye 102. Operator 26 further positions hook 100 to abut and press against pad eye 102 so that an additional slight force will latch and engage them together, for example, or line 101 can be pulled by operator 26 to effect such engagement. In either case connection between line 98 and UUV 12 can be made by only one operator 26 spaced a safe distance away from UUV 12 on surface 14. Contrary to contemporary techniques, the complete safe engagement of UUV 12 by system 10 of the invention is made without requiring anyone to be dangerously close-by in the water as the UUV is bobbing in the water 16 next to ship 15.

Figure 14:
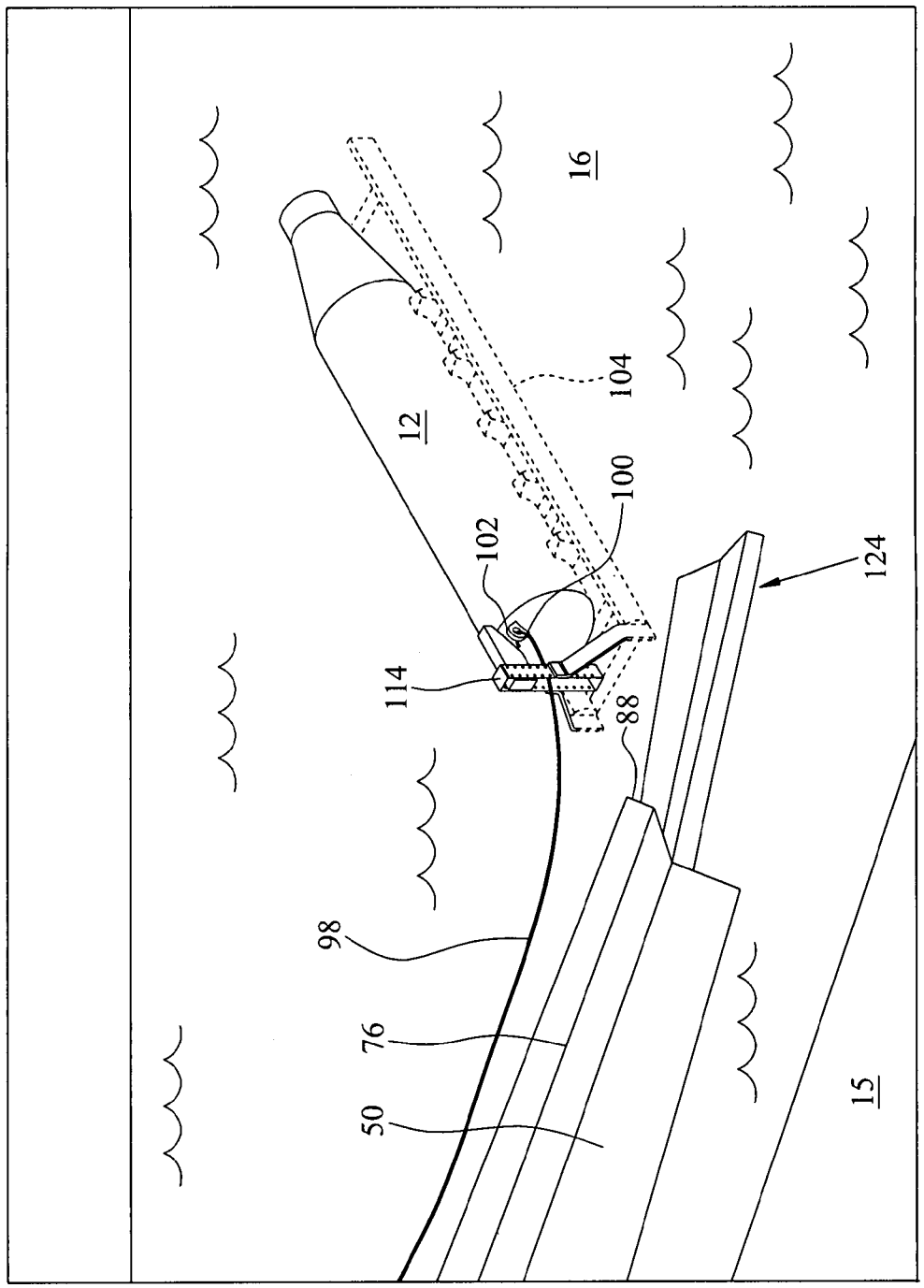
FIG. 14 shows the ship moving slowly forward to separate the UUV from it during recovery of the UUV.
Figure 15:
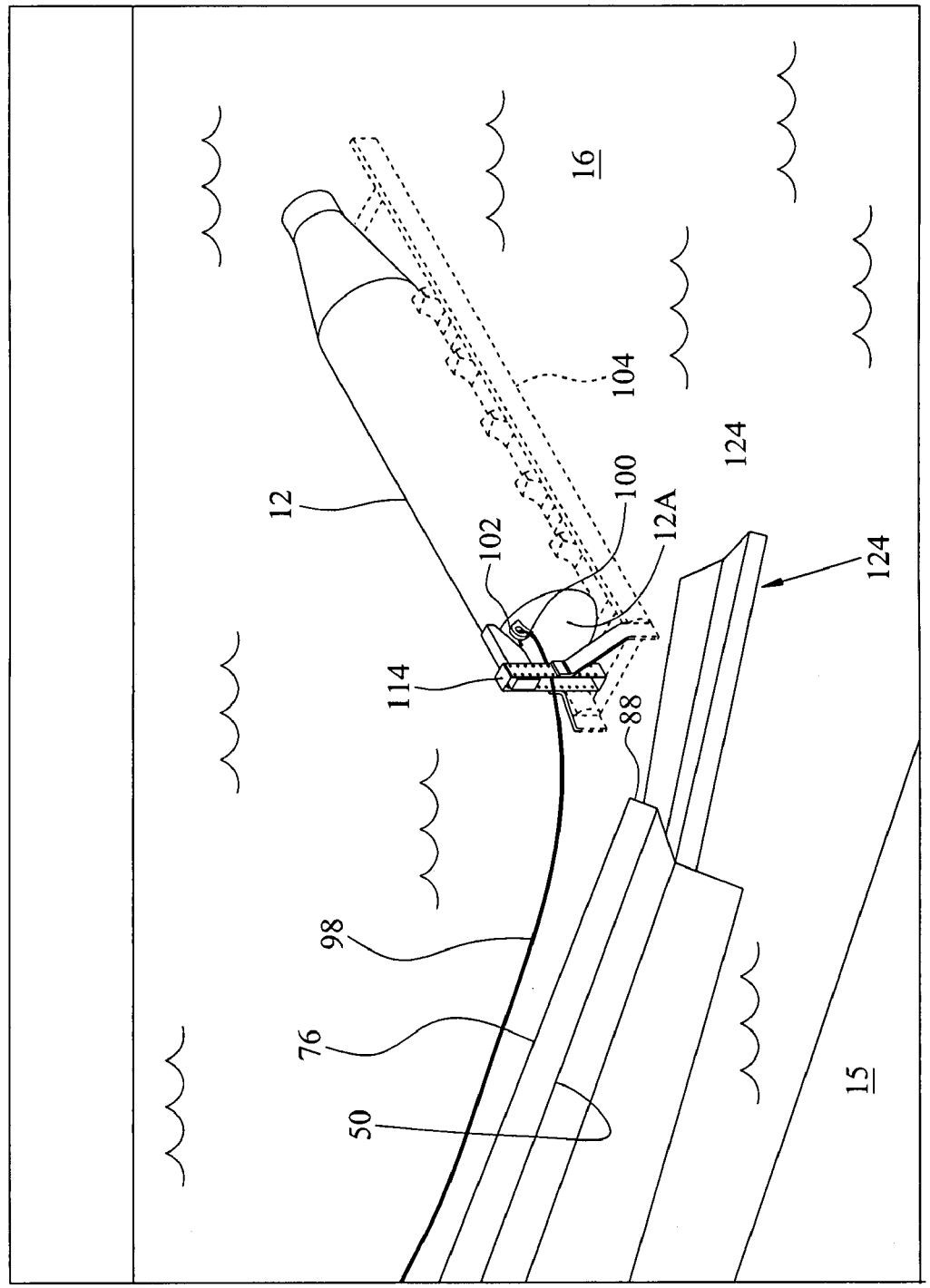
FIG. 15 depicts the line towing the UUV behind the ship in an aligned fashion during its approach to the upright frame member of the sabot.
Figure 16:
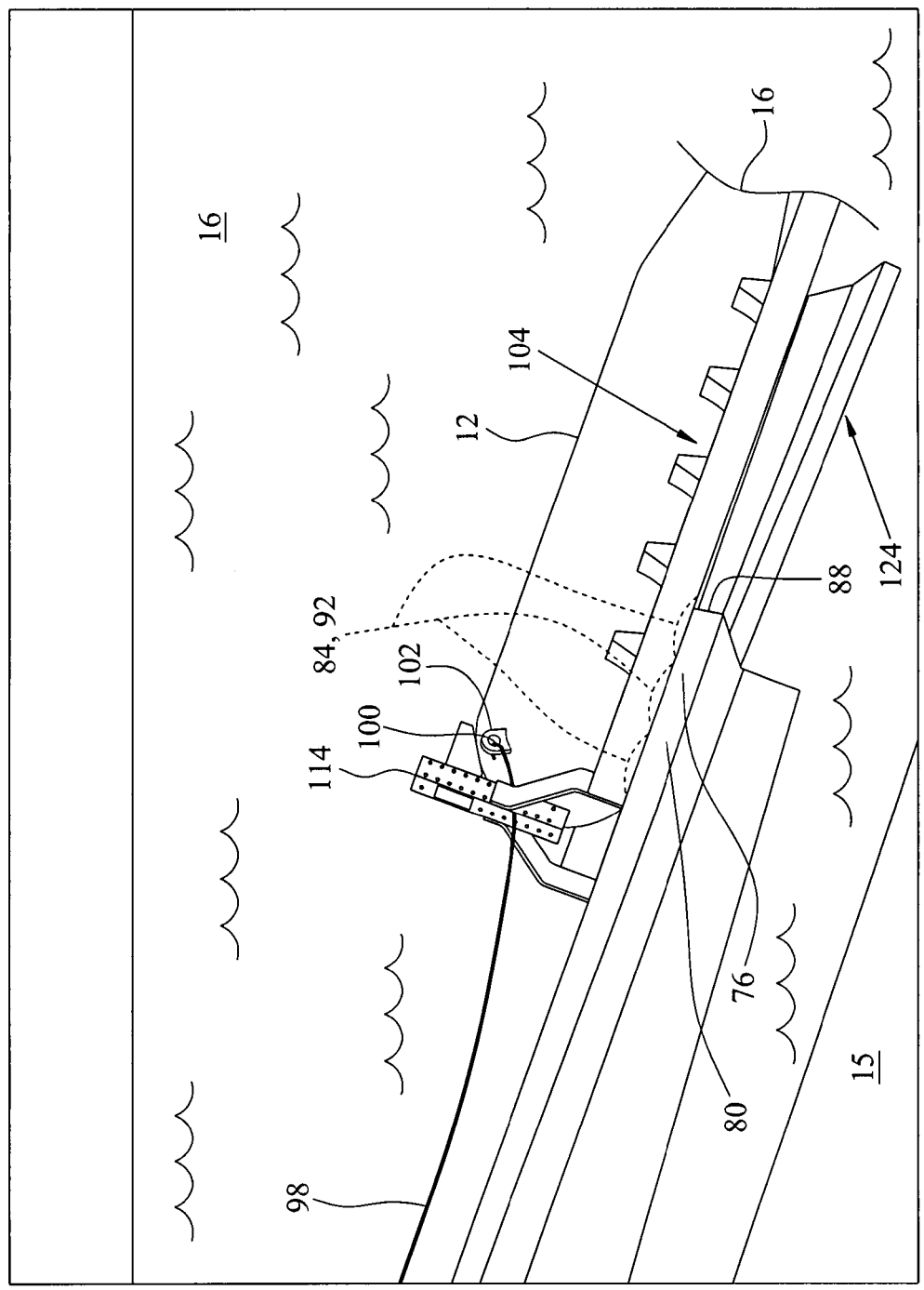
FIG. 16 shows the line pulling the sabot and UUV past the outer end and up elongate conveyer assembly onto the longitudinally extending belts during recovery.
Figure 18:
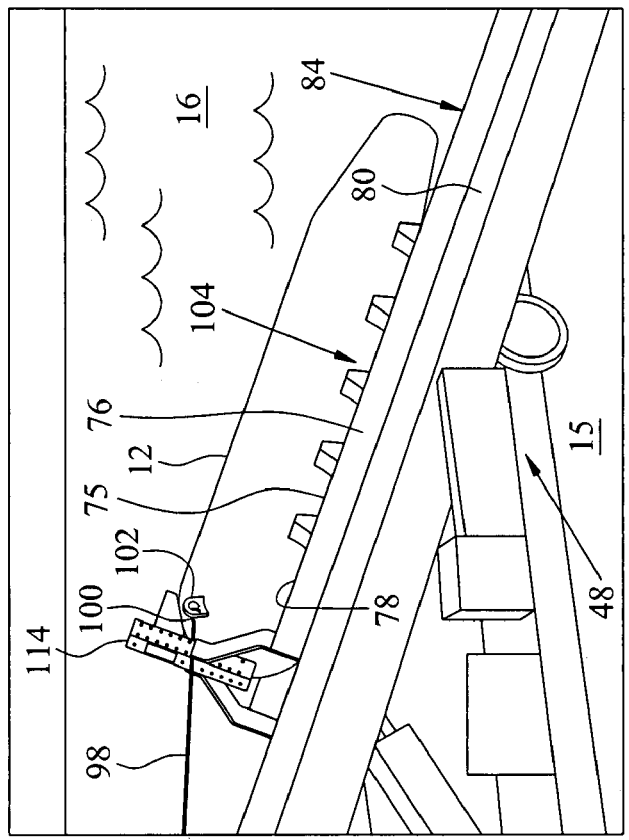
FIG. 18 show the sabot and UUV pulled from the belts and onto longitudinally extending roller tracks of the inboard portion of the conveyer assembly.
Figure 17:
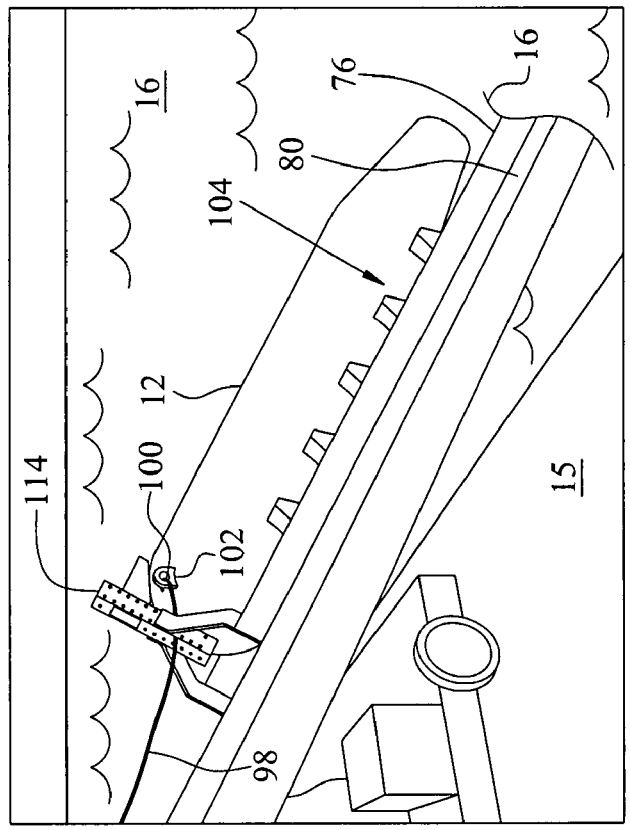
FIG. 17 shows the sabot and UUV being pulled further up on the outboard portion of the conveyer assembly by the line and belts.

Referring to FIG. 14, after connection of line 98 to pad eye 102, ship 15 moves slowly forward to separate UUV 12 from it and thereby greatly reduces the possibility of danger to personnel and damage during recovery of UUV 12. This separation reduces these hazards that have otherwise plagued recovery of UUVs using conventional retrieval procedures and contemporary equipment. Line 98 is securely connected to pad eye 102 via hook 100 and UUV 12 is towed to trail behind ship 15 in an aligned fashion during its approach to frame member 114 of sabot 104, see FIG. 15. No unnecessary hazardous involvement of support personnel is called for with system 10 of the invention.

With UUV 12 and sabot 104 in the water 16, elongate conveyer assembly 76 can be appropriately rotated to put elongate flexible metal strips 124 on outer end 88 of conveyer assembly 76 at and below the surface of water 16. Line 98 extending from motor driven winch 96, through frame member 114 of sabot 104, and to pad eye 102 on UUV 12 is slowly wound onto winch 96 to draw up nose portion 12A along and past strips 124 and against upright frame member 114 at outer end 88. Appropriate control signals 36 received at interface module 22 cause pressurized gas from tanks 122 to be fed to elongate chambers 108 of hollow members 106 of sabot 104 to blow out the water that had flooded them earlier during launch of UUV 12. The evacuated chambers 108 float sabot 104 upward to cradle UUV 12 on lateral members 110 and contoured support members 112. The buoyancy of sabot 104 contributes to raise UUV 12 and sabot 104 to and through the water-air interface and upward up the inclined conveyer assembly 76 on ramp 50, see FIG. 16. Control signals 36 received at interface module 22 also cause pressurized gas from sources 122 to inflate and pressurize nose clamp 116 and tail clamp 118 to securely, engage nose portion and tail portion 12A and 12B of UUV 12.

As line 98 exerts tensile force, sabot 104 and UUV 12 are pulled past outer end 88 and up elongate conveyer assembly 76 and onto belts 84 and 92. Further reeling in of winch 96 increases tension on line 98 to pull sabot 104 and UUV 12 further up the inclined conveyer assembly 76 on ramp 50. Additional control signals 36 are sent by remote control 24 to activate belt drive motors coupled to belts 84 and 92 to displace the belts in the direction that further helps to draw UUV 12 upward out of water 16 and along conveyer assembly 76. With line 98 connected to UUV 12 via pad eye 102 and belts 84 and 92 frictionally engaging UUV 12 and rigid hollow members 106, sabot 104 and UUV 12 are pulled further up on outboard portion 80 of conveyer assembly 76, see FIG. 17, until sabot 104 is pulled from belts 92 and onto longitudinally extending roller tracks 82 of inboard portion 78 of conveyer assembly 76, see FIG. 18. As sabot and UUV 12 make the transition from outboard portion 80 to inboard portion 78 they rest on and bypass the midway location of hinge members 48. As this transition occurs, lifting mechanism 58 can be actuated by appropriate control signals 36 at interface module 22 to rotate inclined ramp 50 and conveyer assembly 76 to the horizontal position. This positioning reduces the load on line 98 and belt 84. Winch 96 can continue to reel in more of line 98 and belts 84 and 92 can continue moving until sabot 104 and UUV 12 are on inboard portion 78 of conveyer assembly 76 at the position shown in FIG. 1. UUV 12 on carriage 20 can be moved and steered across support surface 14 to storage bay 18 by the single operator 26 to complete the entire recovery sequence without any assistance from other personnel or ancillary equipment.

Launch and recovery system 10 of the invention is self-contained and is compact enough to be air-lifted or otherwise transported by truck or other convenient carrier from a far distant supply depot to a seaside or ocean location where it is needed. This feature allows system 10 to be remotely deployed with or without UUV 12 attached to enable timely launch and recovery by as few as one operator. In addition, no ancillary support equipment is required other than a readily available source of electricity to recharge batteries or source of compressed air for filling tanks. Under dire operational scenarios, carriage 20 can be modified to include a suitable electric power generator and an air compressor to eliminate the need for any outside sources for such operations. Launch and recovery system 10 of the invention for UUV 12 is far safer and more effective as compared to the complicated, and difficult to control support cranes and heavy equipment used in the manpower-intensive launch and recovery procedures that have been followed for years. Launch and recovery system 10 needs no other topside personnel or boatmen.

Modifications and alternate embodiments of launch and recovery system 10 may be adapted, and differently configured components could be used in the construction of system 10. In this regard all components can be made from a wide variety of materials and mechanisms to meet the requirements of strength and ruggedness for different applications. Modified designs for system 10 of the invention using sophisticated corrosion resistant and non-corrosive materials including composite materials can be readily made within the scope of one having ordinary skill in the art.

The disclosed components and their arrangements as disclosed herein, all contribute to the novel features of this invention. However, launch and recovery system 10, as disclosed herein is not to be construed as limiting, but rather, is intended to be demonstrative of this inventive concept. It should be readily understood that many modifications and variations of the present invention are possible within the purview of the claimed invention. It is to be understood that within the scope of the appended claims the invention may be practiced otherwise than as specifically described.

We claim:

1. A launch and recovery system for an unmanned undersea vehicle (UUV) in water comprising:
   a carriage to transport said UUV on a support platform to the water;
   an elevating ramp on said carriage to support said UUV thereon;
   an elongate conveyer assembly on said elevating ramp to selectively outwardly and inwardly displace said UUV between said carriage and said water;
   hinge members connected to said carriage and said elevating ramp to rotatably connect said elevating ramp to said carriage;
   hydraulic rams connected to said carriage and said elevating ramp to rotatably displace said elevating ramp about said hinge members; and a winch and line mounted on said elevating ramp and coupled to said UUV to selectively bidirectionally displace said UUV onto said elongate conveyer assembly.

2. The system of claim 1 wherein said hinge members rotatably displace said elevating ramp and said elongate conveyer assembly about said hinge members to selectively rotate said UUV to an elevated position and a lowered position.

3. The system of claim 2 wherein said elongate conveyer assembly has inclined rollers aligned with motor-driven belts for moving said UUV to and from the water.

4. The system of claim 3 further comprising:
a remote control to transmit control signals to control said carriage, said hydraulic rams, said winch and line and said belts of said elongate conveyer assembly during launch and recovery of said UUV; and
a remote control interface module mounted on said carriage to receive said control signals and, in response thereto, to actuate said carriage, said hydraulic rams, said winch and line, and said belts of said elongate conveyer assembly.

5. The system of claim 4 wherein said carriage has motor-driven wheels, wherein said motor-driven wheels are capable of controlled bidirectional rotation to steer and move said carriage on said support platform in response to said remote control interface module.

6. The system of claim 5 wherein said carriage has sufficient mass to provide stabilizing counterweight during launch and recovery of said UUV.

7. The system of claim 6 wherein said elevating ramp is adaptable to fit different sizes of said UUV and said inclined rollers and aligned belts of said elongate conveyer assembly to engage and carry said UUV on said elongate conveyer assembly.

8. The system of claim 7 further comprising
a sabot detachably mounted on said elevating ramp, said sabot having contoured support members to support and carry said UUV and a nose clamp and a tail clamp to retain and release said UUV on and from said sabot.

9. The system of claim 8 wherein said nose clamp and said tail clamp are actuated by pressurized gas, and further comprising at least one valve-actuated pressurized gas tank coupled to said remote control interface module and gas supply lines coupled between said at least one gas tank and said nose and tail clamps, and wherein said nose and tail clamps are actuated by pressurized gas from said at least one gas tank in response to said remote control interface module.

10. A system to launch and recover an unmanned undersea vehicle (UUV) in water comprising:
a motor-driven carriage to transport said UUV on a support platform to said water;
an elevating ramp;
hinge members coupled to said carriage and said elevating ramp to rotatably connect said elevating ramp to said carriage;
an elongate conveyer assembly on said elevating ramp having inclined rollers aligned with motor-driven belts to selectively outwardly and inwardly displace a sabot with said UUV mounted thereon between said carriage and said water, said sabot being configured to support and retain said UUV thereon and being detachably disposed on said rollers and belts of said elongate conveyer assembly to support and carry said UUV on said elongate conveyer assembly;
a lifting mechanism coupled to said carriage and said elevating ramp to rotatably displace said elevating ramp about said hinge members; and a winch mounted on said elevating ramp, said winch having a line coupled to said UUV to allow said winch to selectively longitudinally displace said UUV and said sabot on said elongate conveyer assembly.

11. The system of claim 10 wherein said sabot comprises contoured support members to support and carry said UUV, a nose clamp, and tail clamp, wherein said nose and tail clamps are selectively filled with and vented of pressurized gas to selectively engage and release said UUV during launch and recovery of said UUV.

12. The system of claim 11 wherein said carriage has motor-driven wheels capable of controlled bidirectional rotation to steer and move said carriage on said support platform.

13. The system of claim 12 further comprising:
a remote control configured to transmit control signals to control said carriage, said lifting mechanism, said winch, and said belts of said elongate conveyer assembly; and
a remote control interface module mounted on said carriage configured to receive said control signals and actuate said carriage, said lifting mechanism, said winch, and said belts of said elongate conveyer assembly in response thereto.

14. The system of claim 13 wherein said control signals are transmitted over a wire link coupled to said remote control and said remote control interface module.

15. The system of claim 13 wherein said remote control comprises a transmitter to transmit said control signals via radio, and said remote control interface module comprises a receiver to receive said control signals.

16. A method of launching and recovering an unmanned undersea vehicle (UUV) in water comprising the steps of:
coupling said UUV to a sabot having contoured support members to support and hold said UUV;
rotatably coupling an elevating ramp to a motor driven carriage by hinge members, said elevating ramp having an inboard end and an outboard end;
coupling a lifting mechanism to said carriage and said elevating ramp;
mounting a winch at said inboard end of said elevating ramp;
mounting an elongate conveyer assembly on said elevating ramp, said elongate conveyer assembly having inclined rollers aligned with motor-driven belts;
detachably mounting said sabot on said conveyer assembly;
detachably coupling a line extending from said winch to said UUV;
transporting said UUV, said sabot and said elevating ramp on said carriage across a support platform to said water so that said outboard end of said elevating ramp extends above said water;
rotatably displacing said elevating ramp about said hinge members by said lifting mechanism;
selectively outwardly and inwardly displacing said UUV between said carriage and said water on said conveyer assembly; and
selectively bidirectionally displacing said UUV by said line connected to said winch mounted on said elevating ramp.

17. The method of claim 16 further comprising the steps of:
providing said sabot with a nose clamp and a tail clamp to engage and release said UUV; and selectively filling and venting pressurized gas to said nose clamp and said tail clamp to selectively engage and release said UUV from said sabot during launch and recovery of said UUV.

18. The method of claim 17 further comprising the steps of:
transmitting control signals from a remote control to a remote control interface module mounted on said carriage; and actuating said carriage, said lifting mechanism, said winch, and said belts of said conveyer assembly by said remote control interface module in response to said control signals.

\* \* \* \* \*